(12) United States Patent
Yeem et al.

(10) Patent No.: US 7,712,145 B2
(45) Date of Patent: May 4, 2010

(54) CHIPSET CONFIGURATION AUTHENTICATION VIA MANAGEABILITY ENGINE

(75) Inventors: Kah Meng Yeem, Penang (MY); Thian Aun Tan, Penang (MY); Kar Leong Wong, Perak (MY); Michael N. Derr, El Dorado Hills, CA (US)

(73) Assignee: Intel Corporation, Santa Clara, CA (US)

( * ) Notice: Subject to any disclaimer, the term of this patent is extended or adjusted under 35 U.S.C. 154(b) by 1070 days.

(21) Appl. No.: 11/395,468

(22) Filed: Mar. 30, 2006

(65) Prior Publication Data

US 2007/0234433 A1     Oct. 4, 2007

(51) Int. Cl.
*G06F 17/30* (2006.01)

(52) U.S. Cl. .............................. 726/29; 726/27; 726/26

(58) Field of Classification Search .................. 726/29, 726/27, 26
See application file for complete search history.

(56) References Cited

OTHER PUBLICATIONS

Intel E7501 Chipset Memory Controller Hub (MCH), printed out in 2009.*
A VLSI chip set for a massively parallel scientific processor; Tripiccione, R.; Euro ASIC '92, Proceedings. Jun. 1-5, 1992 pp. 378-380.*
The Blackford Northbridge Chipset for the Intel 5000; Radhakrishnan, S.; Chinthamani, S.; Kai Cheng; Micro, IEEE vol. 27, Issue 2, Mar.-Apr. 2007 pp. 22-33.*
Scalability port: a coherent interface for shared memory multiprocessors; Azimi M.; Briggs, F.; Cekleov, M.; Khare, M.; Kumar, A.; Looi, L.P.; High Performance Interconnects, 2002. Proceedings. 10th Symposium on Aug. 21-23, 2002 pp. 65-70.*

* cited by examiner

*Primary Examiner*—David Y Jung
(74) *Attorney, Agent, or Firm*—Blakely, Sokoloff, Taylor & Zafman LLP (57) ABSTRACT

An embodiment of the present invention is a technique to provide a secure authentication of chipset configuration. A first chipset configuration (CC) register set in an input/output (I/O) manageability engine (ME) partition authenticates and controls enabling a CC functionality. The I/O ME partition manages I/O resources shared with a processor in a secure manner. A second CC register set in a processor interface space provides the CC functionality. The second CC register set includes a global enable register having an enable field securely accessible to the I/O ME partition in a read and write-once accessibility and accessible to the processor via the processor interface space in a read-only accessibility.

27 Claims, 6 Drawing Sheets

CHIPSET CONFIGURATION AUTHENTICATION VIA MANAGEABILITY ENGINE

BACKGROUND

1. Field of the Invention

Embodiments of the invention relate to the field of microprocessors, and more specifically, to chipset architecture.

2. Description of Related Art

Security in microprocessor systems has become increasingly important. Virus, malware, spyware, and other malicious attacks are causing significant damages to enterprise, commercial, and personal computing at an alarm rate. At the same time, development of advanced features for microprocessors, chipsets, and associated hardware and software components has accelerated to satisfy the ever-increasing demands for high performance computing platforms.

One important component in a typical microprocessor system is the input/output (I/O) controller (IOC) chipset. The IOC provides many functionalities to interface to a variety of I/O devices, interconnects, firmware components, and processing units. To provide compatibility with existing computing platforms, the IOC incorporates advanced features in a generic mechanism to solve many issues. When this generic mechanism is compromised by a security breach, the overall system may become vulnerable to malicious attacks.

BRIEF DESCRIPTION OF THE DRAWINGS

Embodiments of invention may best be understood by referring to the following description and accompanying drawings that are used to illustrate embodiments of the invention. In the drawings.

DESCRIPTION

An embodiment of the present invention is a technique to provide a secure authentication of chipset configuration. A first chipset configuration (CC) register set in an input/output (I/O) manageability engine (ME) partition authenticates and controls enabling a CC functionality. The I/O ME partition manages I/O resources shared with a processor in a secure manner. A second CC register set in a processor interface space provides the CC functionality. The second CC register set includes a global enable register having an enable field securely accessible to the I/O ME partition in a read and write-once accessibility and accessible to the processor via the processor interface space in a read-only accessibility.

In the following description, numerous specific details are set forth. However, it is understood that embodiments of the invention may be practiced without these specific details. In other instances, well-known circuits, structures, and techniques have not been shown to avoid obscuring the understanding of this description.

One embodiment of the invention may be described as a process, which is usually depicted as a flowchart, a flow diagram, a structure diagram, or a block diagram. Although a flowchart may describe the operations as a sequential process, many of the operations can be performed in parallel or concurrently. A loop or iterations in a flowchart may be described by a single iteration. It is understood that a loop index or loop indices or counter or counters are maintained to update the associated counters or pointers. In addition, the order of the operations may be re-arranged. A process terminates when its operations are completed. A process may correspond to a method, a program, a procedure, etc. A block diagram may contain blocks or modules that describe an element, an item, a component, a device, a unit, a subunit, a structure, a method, a process, a function, an operation, a functionality, or a task, etc. A functionality or an operation may be performed automatically or manually.

One embodiment of the invention is a technique to provide authentication of CC functionality in a processor interface space in a secure manner. The CC registers are accessible to the ME via a controller link. The ME and the controller link are trusted agents in the system. The authentication code may be maintained in the ME memory to allow the ME to authenticate the CC and confirm that the CC registers have been properly programmed or configured before enabling the CC functionality. In addition, the authentication result or the enabling of the CC functionality is not overridden. This is accomplished by a write-once circuit to write the enable write data only once to an enable field of a global enable register. Furthermore, since the global enable register is accessible to the processor via the processor interface space in a read-only accessibility, it is protected from unsecure accesses.

Figure 1:
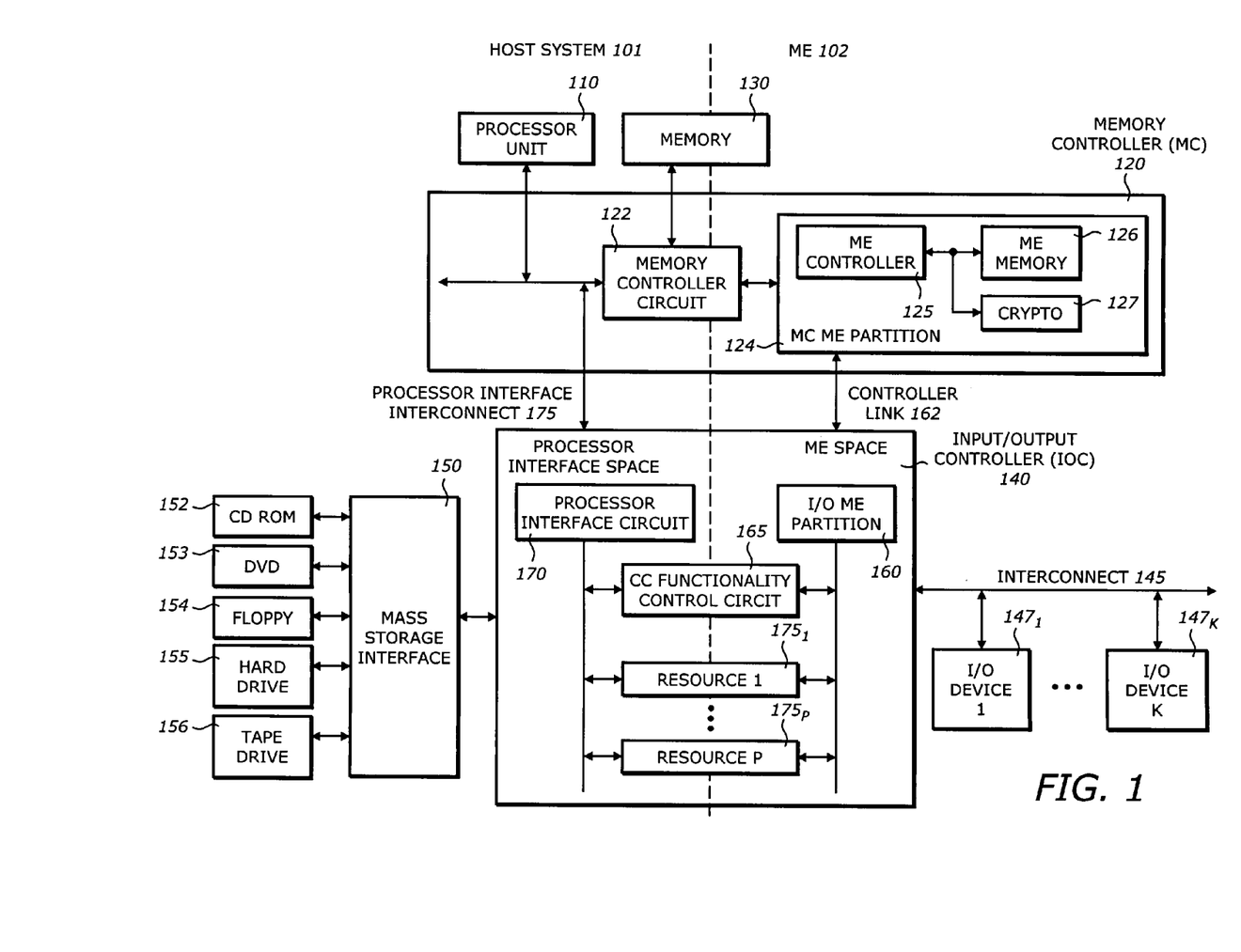
FIG. 1 is a diagram illustrating a system in which one embodiment of the invention can be practiced.

FIG. 1 is a diagram illustrating a system 100 in which one embodiment of the invention can be practiced. The system 100 may be partitioned into a host subsystem 101 and an manageability engine (ME) 102. The system 100 includes a processor unit 110, a memory controller (MC) 120, a memory 130, an input/output controller (IOC) 140, an interconnect 145, input/output (I/O) devices $147_1$, to $147_K$, and a mass storage interface 150.

The host subsystem 101 includes components that are normally operate in a normal environment. The ME 102 is a complete subsystem embedded into the host subsystem 101 integrated to provide isolated system management and firmware-based system features for the platform. The ME 102 normally may not access the resources of the host subsystem 101 and the host subsystem 101 may not access the ME resources. However, the ME 102 may share a few resources with the host subsystem 101 in a secure manner. These shared resources prevent unsecured access between the ME 102 and the host partitions to effectively isolate the ME 102 from the host subsystem 101.

The processor unit 110 represents a central processing unit of any type of architecture, such as processors using hyper threading, security, network, digital media technologies, single-core processors, multi-core processors, embedded processors, mobile processors, micro-controllers, digital signal processors, superscalar computers, vector processors, single instruction multiple data (SIMD) computers, complex instruction set computers (CISC), reduced instruction set computers (RISC), very long instruction word (VLIW), or hybrid architecture.

The MC 120 is a chipset to provide control and configuration of memory and input/output devices such as the memory 130 and the IOC 140. The MC 120 may be integrated into a chipset that integrates multiple functionalities such as graphics, media, isolated execution mode, host-to-peripheral bus interface, memory control, power management, etc. The MC 120 or the memory controller functionality in the MC 120 may be integrated in the processor unit 110. In some embodiments, the memory controller, either internal or external to the processor unit 110, may work for all cores or processors in the processor unit 110. In other embodiments, it may include different portions that may work separately for different cores or processors in the processor unit 110. The MC 120 includes a memory control circuit 122 and a MC ME partition 124. The memory control circuit 122 provides memory control functionalities and other control functions. The MC ME partition 124 is a part of the ME 102. It may share the memory control circuit 122 with the host subsystem 101 in a secure manner.

The MC ME 124 includes at least a ME controller 125, an ME memory 126, and a crypto module 127. The MC ME 124 may include other components. The ME controller 125 is a processor or a controller that may execute program to perform the management functions. The ME memory 126 may include random access memory (RAM), flash memory, or read only memory (ROM) to store program and data. In particular, the ME memory 126 stores an execution code to authenticate the CC functionality and to control enabling the CC functionality. The crypto module 127 is used for encrypting and decrypting and authenticating messages. It may support Advanced Encryption Standard (AES), AES-Cipher Block Chaining (CBC), Rivest Cipher 4 (RC4) algorithms for encryption and decryption. It may support secure hash algorithm-1 (SHA-1), message digest algorithm 5 (MD5), and hash message authentication code (HMAC) algorithms for authentication.

The main memory 130 stores system code and data. The main memory 130 is typically implemented with dynamic random access memory (DRAM), static random access memory (SRAM), or any other types of memories including those that do not need to be refreshed. The main memory 130 may include multiple channels of memory devices such as DRAMs. The DRAMs may include Double Data Rate (DDR2) devices.

The IOC 140 has a number of functionalities that are designed to support I/O functions. The IOC 140 may also be integrated into a chipset together or separate from the MC 120 to perform I/O functions. The IOC 140 may include a number of interface and I/O functions such as peripheral component interconnect (PCI) bus interface, processor interface, interrupt controller, direct memory access (DMA) controller, power management logic, timer, system management bus (SMBus), universal serial bus (USB) interface, mass storage interface, low pin count (LPC) interface, wireless interconnect, direct media interface (DMI), etc. The IOC 140 includes an I/O ME partition 160, a processor interface space circuit 170, a CC functionality control circuit 165 and P resources $175_1$ to $175_P$.

The I/O ME partition 160 is a part of the ME 102. It manages I/O resources shared with the processor subsystem 101 in a secure manner. The I/O ME partition 160 operates in a peripheral interconnect space that is secured. The peripheral interconnect space is associated with the Peripheral Component Interconnect (PCI) link. The I/O ME partition 160 is interfaced to the MC ME partition 124 via a controller link 162. The controller link 162 is a secure link in the ME 102. It typically consumes very low power. It has low pin count, typically includes two signals, a bi-directional clock signal and a data signal, and a reset signal. It has independent clocking. The bandwidth of the controller link 162 is medium, ranging from 8 Megabits per second (Mbps) to 66 Mbps.

The processor interface circuit 170 includes circuits that operate in the processor interface space. The processor interface space is accessible to the processor unit 110 via a processor interface interconnect or link 175. In one embodiment, the processor interface interconnect 175 is a direct media interface (DMI) interconnect or link. The processor interface circuit 170 may include circuits for CC. The CC is a component that operates on a transaction as it arrives from the processor interface interconnect 175. The CC provides a generic mechanism in hardware that is capable of working around a wide variety of issues or bugs in existing I/O chipsets. This may include a chipset patch (CP) architecture.

The CC functionality control circuit 165 is a circuit to allow the ME 102 to authenticate and control enabling the CC functionality and to control enabling the CC functionality. It is accessible to both the I/O ME partition 160 and the processor interface circuit 170. The type of accessibility depends on the nature of the components. The P resources $175_1$ to $175_P$ may include any resources that are shared by both the I/O ME partition 160 and the processor interface space circuit 170. Examples of the P resources $175_1$ to $175_P$ may include flash memories and media access controller (MAC) for Gigabit Ethernet. The I/O ME partition 160 may include other components that are not shown such as timers, thermal control interface, power management circuits, general purpose I/O devices, etc.

The interconnect 145 provides interface to peripheral devices. The interconnect 145 may be point-to-point or connected to multiple devices. For clarity, not all interconnects are shown. It is contemplated that the interconnect 145 may include any interconnect or bus such as Peripheral Component Interconnect (PCI), PCI Express, Universal Serial Bus (USB), Small Computer System Interface (SCSI), serial SCSI, and Direct Media Interface (DMI), etc.

The mass storage interface 150 interfaces to mass storage devices to store archive information such as code, programs, files, data, and applications. The mass storage interface may include SCSI, serial SCSI, Advanced Technology Attachment (ATA) (parallel and/or serial), Integrated Drive Electronics (IDE), enhanced IDE, ATA Packet Interface (ATAPI), etc. The mass storage device may include compact disk (CD) read-only memory (ROM) 152, digital video/versatile disc (DVD) 153, floppy drive 154, and hard drive 155, tape drive 156, and any other magnetic or optic storage devices. The mass storage device provides a mechanism to read machine-accessible media.

The I/O devices $147_1$ to $147_K$ may include any I/O devices to perform I/O functions. Examples of I/O devices $147_1$ to $147_K$ include controller for input devices (e.g., keyboard, mouse, trackball, pointing device), media card (e.g., audio, video, graphic), network card, and any other peripheral controllers.

Figure 2:
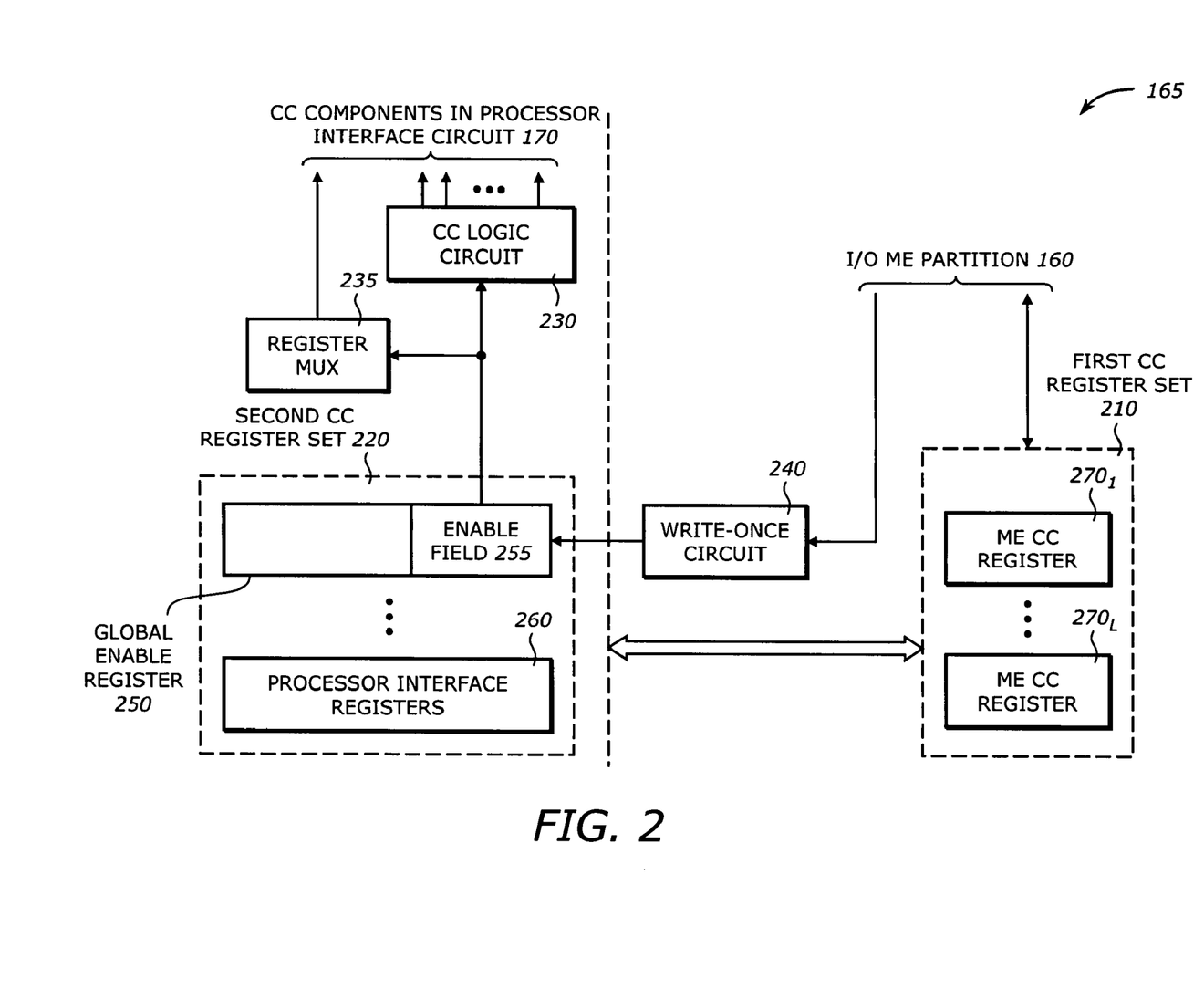
FIG. 2 is a diagram illustrating a chipset configuration (CC) configuration control circuit according to one embodiment of the invention.

FIG. 2 is a diagram illustrating the chipset configuration (CC) functionality control circuit 165 shown in FIG. 1 according to one embodiment of the invention. The CC functionality control circuit 165 includes a first CC register set 210, a second first chipset configuration (CC) register set 220, a register multiplexer 235, a CC logic circuit 230, and a write-once circuit 240. The CC functionality control circuit 165 may be a chipset patch (CP) configuration control circuit that controls any CP configuration.

The first CC register set 210 is in the I/O ME partition 160 to authenticate and control enabling the CC functionality. It includes L ME CC registers $270_1$ to $270_L$. These registers contain data to be transferred to the second CC register set 220 or the data read from the second CC register set 220.

The second CC register set is in the processor interface space. It provides the CC functionality for various components in the IOC 140. The second CC register set includes a global enable register 250 and a number of processor interface registers 260. The global enable register 250 has an enable field 255. The enable field 255 contains an enable data that is used to enable/disable or control various CC components in the processor space circuit 170. It may include a single bit or any number of bits. The enable field 255 or the global enable register 250 is securely accessible to the I/O ME partition 160 in a read and write-once accessibility and accessible to the processor unit 110 via the processor interface space in a read-only accessibility. The processor interface registers 260 include a number of registers that are programmed or configured for the CC functionality. The processor interface registers 260 are accessible in a read and write accessibility to the processor unit 110 via the processor interface interconnect 175. Since the access is from an unsecured source, the CC functionality may be compromised. Therefore, the CC functionality has to be authenticated and enabled by a trusted and secure source such as the I/O ME partition 160.

The register multiplexer 235 provides a selection of the data to be returned to the read buffer accessible to the processor unit 110. When the processor unit 110 (FIG. 1) accesses the global enable register 250, it is prohibited from writing to the global enable register 250. It may only read the contents of the global enable register 250. The register multiplexer 235 is used to select the data to be read by the processor unit 110. The CC logic circuit 230 includes a number of logic circuits to perform CC functionalities. It is enabled by the enable field 255. When enabled, the CC logic circuit 230 enables the CC functionality as programmed by the processor interface registers 260.

The write-once circuit 240 provides a write access to the global enable register 250, including the enable field 255. The write access is initiated from the I/O ME partition 160. This may be transferred from the execution of the execution code by the ME controller 125 in the MC ME partition 124 (FIG. 1). The write-once circuit 240 allows the write access to be performed only once. Further writing to the global enable register 250 has no affect on the global enable register 250. This feature prevents the global enable register from being overridden by other sources.

The write-once circuit 240 write an assertion value to the enable field 255 to enable the CC functionality if the second CC register set 220 (e.g., the processor interface registers 260) is properly authenticated. The write-once circuit 240 writes a negation value to the enable field 255 to disable the CC functionality if the second CC register set 220 (e.g., the processor interface registers 260) is not properly authenticated. In addition, the enable field 255 is negated upon reset to disable the CC functionality.

Figure 3:
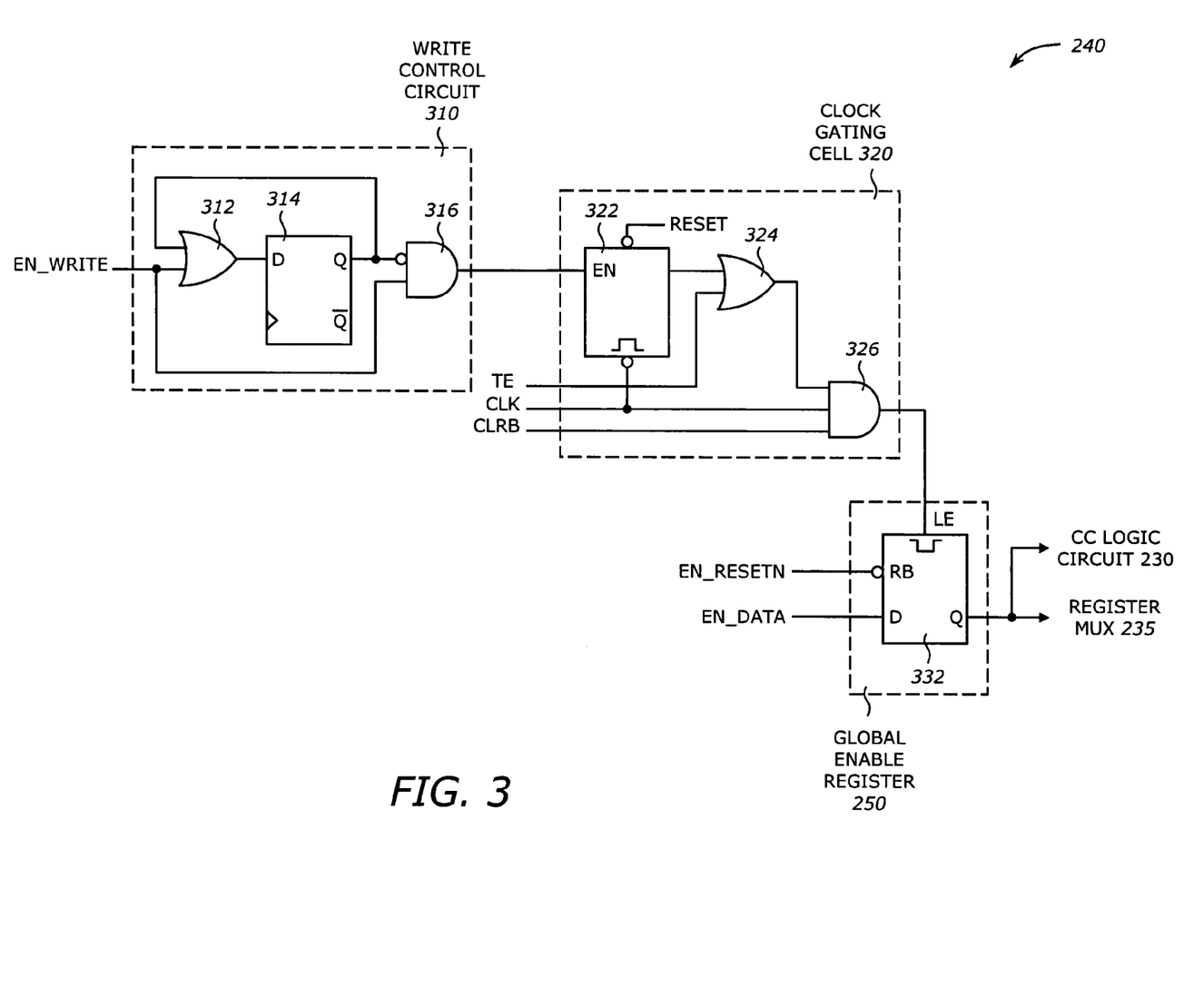
FIG. 3 is a diagram illustrating a write-once circuit according to one embodiment of the invention.

FIG. 3 is a diagram illustrating the write-once circuit 240 according to one embodiment of the invention. The write-once circuit 240 includes a write control circuit 310 and a clock gating cell 320.

The write control circuit 310 includes an OR gate 312, a flip flop 314, and an AND gate 316. The OR gate 312 receives an input EN_WRITE and a feedback signal from the output of the flip-flop 314. The EN_WRITE signal is an active HIGH write enable signal that indicates a write access. It may be a decoded signal from the address of the global enable register 250 as mapped to the address space of the ME controller 125 and the write cycle signal of the ME controller 125 or a write circuit in the I/O ME partition 160. Since the EN_WRITE is issued from the ME 102, it is secure. Furthermore, since the EN_WRITE is the only signal that may enable the writing to the global enable register 250, the processor unit 110 is prohibited from writing to the global enable register 250. The feedback signal from the output of the flip-flop 314 to the OR gate 312 provides a lock on the data to the flip-flop 314 so that the write access may be performed only once. The AND gate 316 gates the output of the flip-flop 314 with the EN_WRITE signal. This gating ensures that after the first write cycle, subsequent writes are ignored because the output of the flip-flop 314 is locked at HIGH, resulting in a LOW at the output of the AND gate 316. This LOW output disables the clock gating cell 320.

The clock gating cell 320 includes a flip-flop 322, an OR gate 324, and an AND gate 326. The flip-flop 322 is a pulsed latch that receives the clock pulse from a clock (CLK) signal. When the CLK signal is pulsed, the flip-flop 322 transfers the input signal at the EN input to the output. The OR gate 324 receives the output of the flip-flop 322 and a Test Enable (TE) signal. The AND gate 326 receives the output of the OR gate 324, the CLK signal, and a CLRB signal. The TE and the CLRB signals are the testability signals. They are provided to bypass the write control circuit 310 to allow Design For Testability (DFT) testing. The CLRB signal has a higher priority than the TE signal. The CLRB signal, when asserted, disables the global enable register 250 for write. The TE, when asserted, enables the global enable storage 250 for write.

The global enable register 250 is a latch that is controlled by the clock gating cell. When the latch enable (LE) signal is asserted (e.g., LOW), the input data EN_DATA is latched and available at the output. When the LE is negated, the global enable register 250 retains the previously latched data. The EN_DATA is the write enable data to be written to the global enable register 250. When the authentication of the CC functionality indicates that the processor interface registers 260 are properly programmed or configured, the EN_DATA is asserted to enable the CC functionality. Otherwise, it is negated to disable the CC functionality. The global enable register 250 has a reset input RB that receives an EN_RESETN signal. When the EN_RESETN signal is asserted LOW, global enable register 250 is cleared and the enable field 255 is negated to disable the CC functionality.

Figure 4:
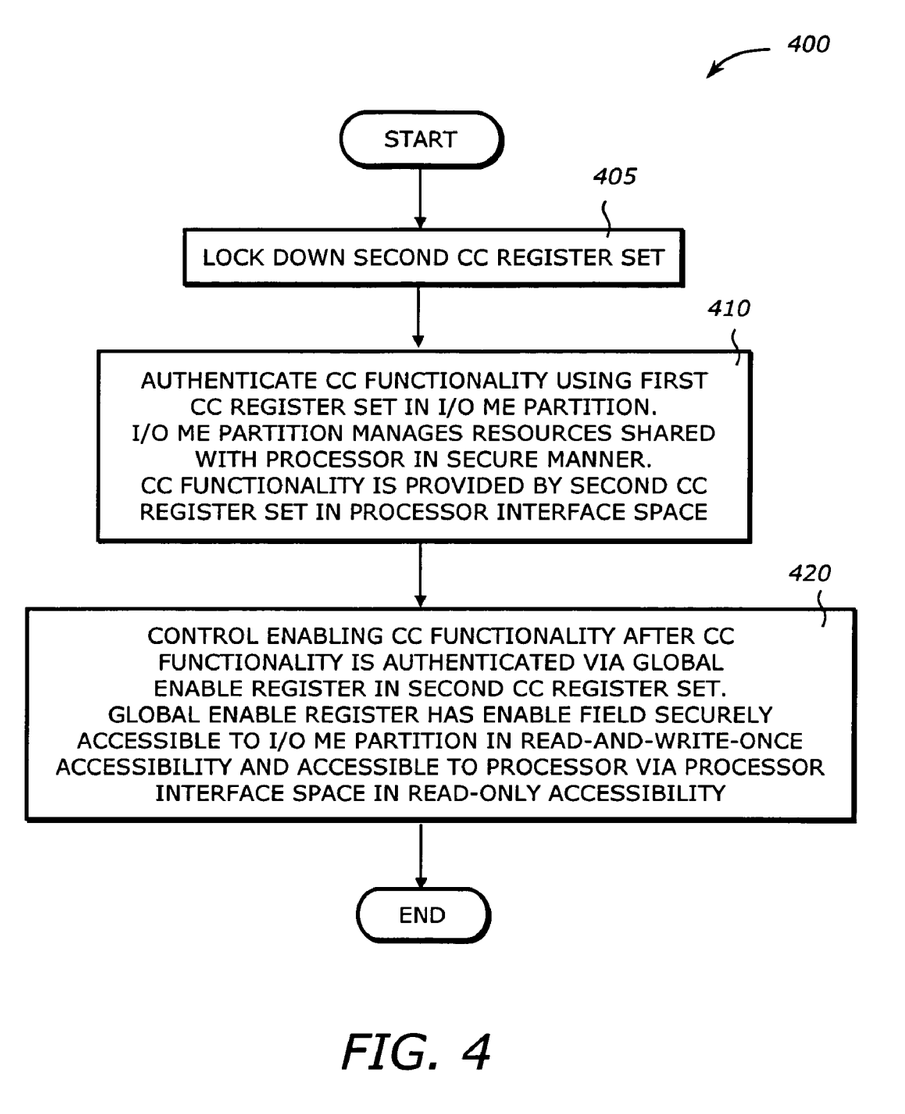
FIG. 4 is a flowchart illustrating a process to control CC functionality according to one embodiment of the invention.

FIG. 4 is a flowchart illustrating a process 400 to control CC functionality according to one embodiment of the invention.

Upon START, the process 400 locks down a second CC functionality register set (Block 405). This is to prevent an un-trusted agent or the processor from re-writing the CC functionality registers. Then, the process 400 authenticates a CC functionality using the first chipset configuration (CC) register set in an I/O ME partition (Block 410). The I/O ME partition manages resources shared with a processor in a secure manner. The CC functionality is provided by the second CC register set in a processor interface space. In one embodiment, the processor interface space is a direct media interface (DMI) space provided by the DMI link.

Next, the process 400 controls enabling the CC functionality after the CC functionality is authenticated via a global enable register in the second CC register set (Block 420). The global enable register has an enable field securely accessible to the I/O ME partition in a read and write-once accessibility and accessible to the processor via the processor interface space in a read-only accessibility. The process 400 is then terminated.

Figure 5:
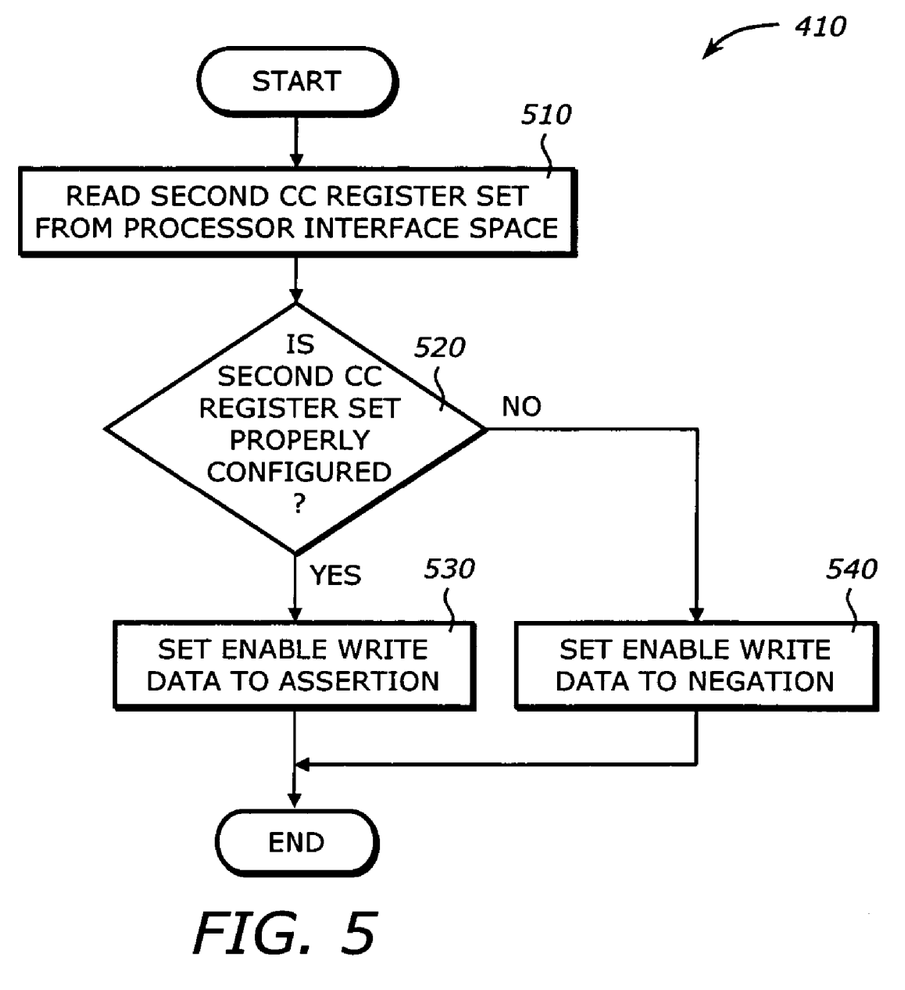
FIG. 5 is a flowchart illustrating a process to authenticate the CC functionality according to one embodiment of the invention.

FIG. 5 is a flowchart illustrating the process 410 shown in FIG. 4 to authenticate the CC functionality according to one embodiment of the invention.

Upon START, the process 410 reads the second CC register set from the processor interface space (Block 510). Next, the process 410 determines if the second CC register set is properly configured or programmed (Block 520). This may be determined by comparing the contents of the second CC register set with some known data, or by checking if any rule has been violated, or by checking if any conflicts may occur.

Next, if the second CC register set is properly programmed or configured, the process 410 sets an enable write data to an assertion value (Block 530) and is then terminated. The assertion value of the enable write data corresponds to enabling the CC functionality. Otherwise, if the second CC register set is not properly programmed or configured, the process 410 sets an enable write data to a negation value (Block 540) and is then terminated. The negation value of the enable write data corresponds to disabling the CC functionality.

Figure 6:
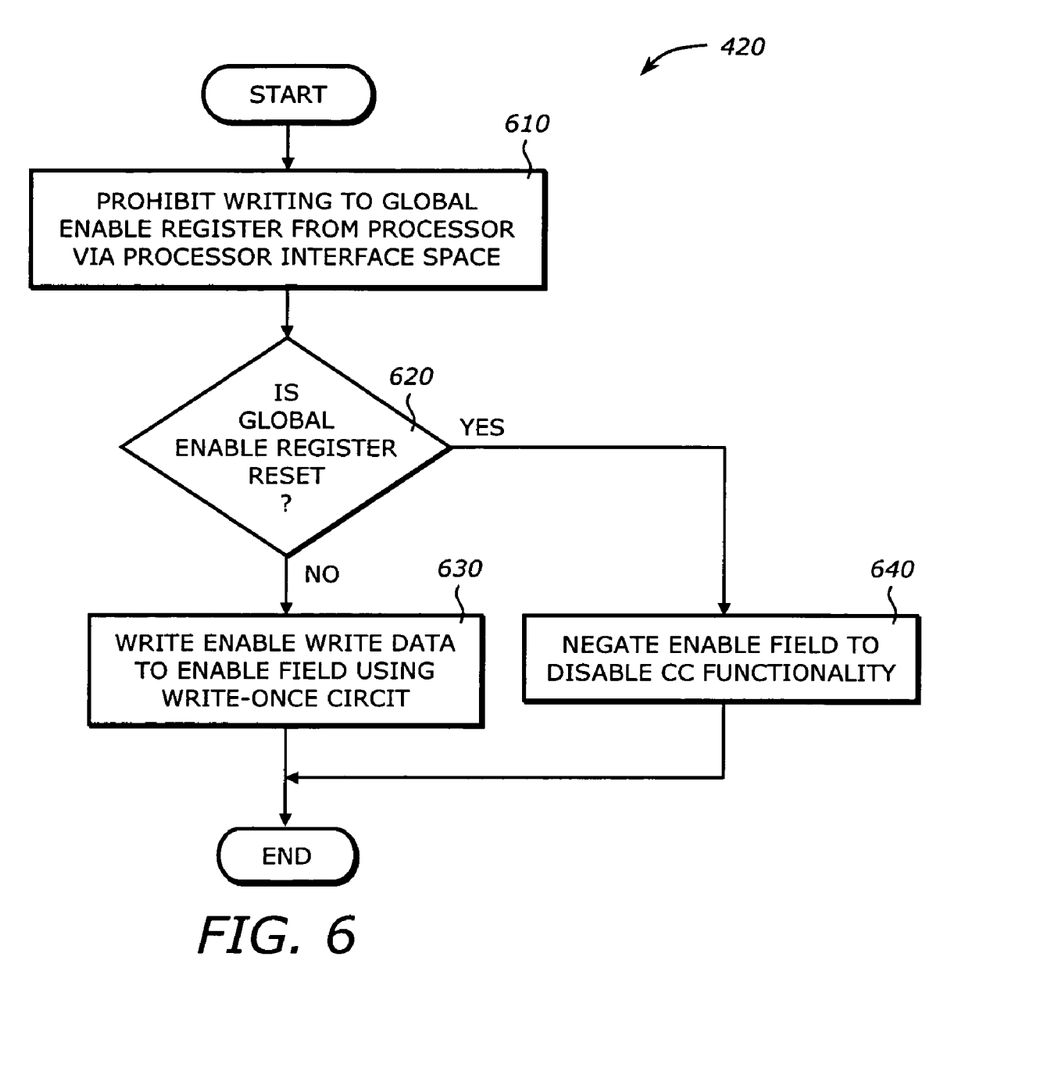
FIG. 6 is a flowchart illustrating a process to control enabling the CC functionality according to one embodiment of the invention.

FIG. 6 is a flowchart illustrating the process 420 shown in FIG. 4 to control enabling the CC functionality according to one embodiment of the invention.

Upon START, the process 420 prohibits writing to the global enable register from the processor via the processor interface space (Block 610). This may be performed by decoding the write enable signal using only signals from the ME subsystem 102. Next, the process 420 determines if the global enable register is reset (Block 620). If so, the process 420 negates the enable field to disable the CC functionality (Block 630) and is then terminated. Otherwise, the process 420 writes the enable write data to the enable field using a write-once circuit (Block 640) and is then terminated. The enable write data has been set to assertion or negation value at the end of the authentication procedure as shown in FIG. 5.

Elements of embodiments of the invention may be implemented by hardware, firmware, software or any combination thereof. The term hardware generally refers to an element having a physical structure such as electronic, electromagnetic, optical, electro-optical, mechanical, electro-mechanical parts, components, or devices, etc. The term software generally refers to a logical structure, a method, a procedure, a program, a routine, a process, an algorithm, a formula, a function, an expression, etc. The term firmware generally refers to a logical structure, a method, a procedure, a program, a routine, a process, an algorithm, a formula, a function, an expression, etc., that is implemented or embodied in a hardware structure (e.g., flash memory). Examples of firmware may include microcode, writable control store, micro-programmed structure. When implemented in software or firmware, the elements of an embodiment of the present invention are essentially the code segments to perform the necessary tasks. The software/firmware may include the actual code to carry out the operations described in one embodiment of the invention, or code that emulates or simulates the operations. The program or code segments can be stored in a processor or machine accessible medium or transmitted by a computer data signal embodied in a carrier wave, or a signal modulated by a carrier, over a transmission medium. The "processor readable or accessible medium" or "machine readable or accessible medium" may include any medium that can store, transmit, or transfer information. Examples of the processor readable or machine accessible medium include an electronic circuit, a semiconductor memory device, a read only memory (ROM), a flash memory, an erasable ROM (EROM), an erasable programmable ROM (EPROM), a floppy diskette, a compact disk (CD) ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, Intranet, etc. The machine accessible medium may be embodied in an article of manufacture. The machine accessible medium may include data that, when accessed by a machine, cause the machine to perform the operations described above. The machine accessible medium may also include program code embedded therein. The program code may include machine readable code to perform the operations described above. The term "data" here refers to any type of information that is encoded for machine-readable purposes. Therefore, it may include program, code, data, file, etc.

All or part of an embodiment of the invention may be implemented by hardware, software, or firmware, or any combination thereof. The hardware, software, or firmware element may have several modules coupled to one another. A hardware module is coupled to another module by mechanical, electrical, optical, electromagnetic or any physical connections. A software module is coupled to another module by a function, procedure, method, subprogram, or subroutine call, a jump, a link, a parameter, variable, and argument passing, a function return, etc. A software module is coupled to another module to receive variables, parameters, arguments, pointers, etc. and/or to generate or pass results, updated variables, pointers, etc. A firmware module is coupled to another module by any combination of hardware and software coupling methods above. A hardware, software, or firmware module may be coupled to any one of another hardware, software, or firmware module. A module may also be a software driver or interface to interact with the operating system running on the platform. A module may also be a hardware driver to configure, set up, initialize, send and receive data to and from a hardware device. An apparatus may include any combination of hardware, software, and firmware modules.

While the invention has been described in terms of several embodiments, those of ordinary skill in the art will recognize that the invention is not limited to the embodiments described, but can be practiced with modification and alteration within the spirit and scope of the appended claims. The description is thus to be regarded as illustrative instead of limiting.

What is claimed is:

1. An apparatus comprising:
a first chipset configuration (CC) register set in an input/output (I/O) manageability engine (ME) partition in a controller to authenticate and control enabling a CC functionality, the I/O ME partition managing I/O resources shared with a processor in a secure manner; and
a second CC register set in a processor interface space in the controller coupled to the first CC register set to provide the CC functionality, the second CC register set including a global enable register having an enable field securely accessible to the I/O ME partition in a read and write-once accessibility and accessible to the processor via the processor interface space in a read-only accessibility.

2. The apparatus of claim 1 further comprising:
a write-once circuit to write an assertion value to the enable field to enable the CC functionality if the second CC register set is properly authenticated.

3. The apparatus of claim 2 wherein the write-once circuit writes a negation value to the enable field to disable the CC functionality if the second CC register set is not properly authenticated.

4. The apparatus of claim 1 wherein the enable field is negated upon reset to disable the CC functionality.

5. The apparatus of claim 1 wherein the I/O ME partition resides in an I/O chipset and is connected to a memory controller (MC) ME partition in an MC chipset via a controller link.

6. The apparatus of claim 5 wherein the MC ME partition has an ME controller to execute an authentication code to authenticate the CC functionality.

7. The apparatus of claim 1 wherein the processor interface space is a direct media interface (DMI) space.

8. The apparatus of claim 1 wherein the I/O ME partition operates in a peripheral interconnect space.

9. The apparatus of claim 1 wherein the enable field is not writable from the processor via the processor interface space.

10. A method comprising:
authenticating, in a controller, a CC functionality using a first chipset configuration (CC) register set in an input/output (I/O) manageability engine (ME) partition, the I/O ME partition managing resources shared with a processor in a secure manner, the CC functionality being provided by a second CC register set in a processor interface space; and
controlling, in the controller, enabling the CC functionality after the CC functionality is authenticated via a global enable register in the second CC register set, the global enable register having an enable field securely accessible to the I/O ME partition in a read and write-once accessibility and accessible to the processor via the processor interface space in a read-only accessibility.

11. The method of claim 10 wherein authenticating the CC functionality comprises:
reading the second CC register set from the processor interface space;
determining if the second CC register set is properly configured; and
setting enable write data to assertion value if the second CC register set is properly configured and to negation value otherwise.

12. The method of claim 11 wherein controlling enabling the CC functionality comprises:
writing the enable write data to the enable field using a write-once circuit.

13. The method of claim 10 wherein controlling enabling the CC functionality comprises:
negating the enable field to disable the CC functionality if the global enable register is reset.

14. The method of claim 10 further comprising:
interfacing to the I/O ME partition residing in a first chipset by a memory controller (MC) ME partition in a MC chipset via a controller link.

15. The method of claim 14 wherein authenticating comprises:
executing an authentication code by an ME controller in the MC ME partition.

16. The method of claim 10 wherein the processor interface space is a direct media interface (DMI) space.

17. The method of claim 10 wherein the first ME partition operates in a peripheral interconnect space.

18. The method of claim 10 wherein controlling enabling the CC functionality comprises:
prohibiting writing to the global enable register from the processor via the processor interface space.

19. A processor system comprising:
a processor;
a memory controller (MC) manageability engine (ME) partition of an ME in an MC chipset coupled to the processor;
a plurality of resources shared by the processor and the ME, the resources including at least a memory; and
a CC functionality control circuit comprising:
a first chipset configuration (CC) register set in an input/output (I/O) ME partition in a controller to authenticate and control enabling a CC functionality, the I/O ME partition managing I/O resources shared with the processor in a secure manner via the MC ME partition, and
a second CC register set in a processor interface space in the controller coupled to the first CC register set to provide the CC functionality, the second CC register set including a global enable register having an enable field securely accessible to the I/O ME partition in a read and write-once accessibility and accessible to the processor via the processor interface space in a read-only accessibility.

20. The system of claim 19 wherein the CC functionality control circuit further comprises:
a write-once circuit to write an assertion value to the enable field to enable the CC functionality if the second CC register set is properly authenticated.

21. The system of claim 20 wherein the write-once circuit writes a negation value to the enable field to disable the CC functionality if the second CC register set is not properly authenticated.

22. The system of claim 19 wherein the enable field is negated upon reset to disable the CC functionality.

23. The system of claim 19 wherein the I/O ME partition resides in an I/O chipset and is connected to the MC ME partition via a controller link.

24. The system of claim 23 wherein the MC ME partition has an ME controller to execute an authentication code to authenticate the CC functionality.

25. The system of claim 19 wherein the processor interface space is a direct media interface (DMI) space.

26. The system of claim 19 wherein the I/O ME partition operates in a peripheral interconnect space.

27. The system of claim 19 wherein the enable field is not writable from the processor via the processor interface space.

* * * * *